(12) United States Patent
Oliva

(10) Patent No.: US 6,177,979 B1
(45) Date of Patent: Jan. 23, 2001

(54) OPTICAL CODE SCANNING READER WITH LASER BEAMS TRAVELLING ALONG A MINIMUM OF TWO DIFFERENT OPTICAL PATHS

(75) Inventor: Guido Maurizio Oliva, Rovigo (IT)

(73) Assignee: Datalogic, S.p.A., Lippo di Calderara di Reno (IT)

( * ) Notice: Under 35 U.S.C. 154(b), the term of this patent shall be extended for 0 days.

(21) Appl. No.: 09/207,592

(22) Filed: Dec. 8, 1998

(30) Foreign Application Priority Data

Dec. 16, 1997 (EP) .................................................. 97830674

(51) Int. Cl.⁷ .................................................. G03B 27/42
(52) U.S. Cl. ........................................ 355/53; 235/462.38
(58) Field of Search ........................... 355/53; 235/462.38

(56) References Cited

U.S. PATENT DOCUMENTS 5,091,744  2/1992  Omata ..................................... 355/53
6,028,660 * 2/2000  Van Der Sann et al. ............... 355/53

FOREIGN PATENT DOCUMENTS 0 480 348 A1   4/1992  (EP) .
0 492 065 A2   7/1992  (EP) .

* cited by examiner

*Primary Examiner*—Harold I. Pitts
(74) *Attorney, Agent, or Firm*—Nixon & Vanderhye, P.C.

(57) ABSTRACT

An optical code scanning reader comprising laser beam generating elements focused at different distances from an optical receiver element having an optical axis and a photoreceiver element having a preselected photosensitive area; the laser beams travel along a minimum of two different optical paths in the reader and at least one of the two optical paths is offset in respect to the optical axis; the value of the offset ($H_o$) is preselected in such a way that the quantity of light diffused by the code which reaches the photosensitive area for each beam attains a preselected value.

26 Claims, 5 Drawing Sheets

OPTICAL CODE SCANNING READER WITH LASER BEAMS TRAVELLING ALONG A MINIMUM OF TWO DIFFERENT OPTICAL PATHS

BACKGROUND OF THE INVENTION

This application is based on the European Patent Application No. 97830674.4, the content of which is incorporated hereinto by reference.

The present invention relates to an optical code scanning reader with laser beams travelling along a minimum of two different optical paths and focused to read said optical code at different distances.

Patent EP-0 480 348 describes a bar code reader comprising a minimum of two laser beam sources and suitable optical means for guiding the emitted beams onto a reading area and receiving the light diffused from said area. The optical means focus each beam independently on different areas of said reading area, thus enabling an optical code to be read at different reading distances.

Each of the laser beams is capable of "resolving" a portion of a bar code having a minimum assigned dimension in a given area around the focal point and said area determines the depth of field of the reader for said portion of code.

The above-mentioned reader uses two laser beams focused on two different points. One beam, dedicated to reading the optical code from a close distance, is focused on a point closer to the optical receiving means than the focal point of the other beam which is dedicated to reading from a remote distance. Two reading fields are thus obtained which, although partially overlapping, create a total depth of field greater than that of a single laser beam.

In the reader in accordance with EP-0 480 348 the laser beams travel along "coincident" optical paths and the individual optical paths are caused to overlap by the use of deflector elements consisting of beamsplitters. The beamsplitters, however, reduce the utilisable power of each individual laser beam by 50%. Where several laser beams are present, therefore, loss of power increases in proportion to the number of beamsplitters used, reducing the available power by 50% for each additional beamsplitter.

The reader described in the above-mentioned patent could hypothetically be improved by reducing the loss of available power by means of polarized beamsplitters, since it is well-known that these are more efficient.

However, if wishing to use more than two lasers, the subsequent beamsplitters would in any case have to be of non-polarized type and this would, as already mentioned, lead to a loss of power of 50% for each conventional type of beamsplitter added.

Polarized beamsplitters could moreover not be used when optical codes printed on shiny surfaces have to be read. In such cases it is in fact necessary for the vector of polarization, by means of which the laser beams are guided onto the code, to be identically orientated.

The inventors took into consideration the possibility of causing the different laser beams to travel along different optical paths, but this gives rise to the problem of parallax. In fact, except for one laser beam, all the other beams are offset in respect to the optical axis of the optical receiving means, i.e. said other beams occupy a spatial position remote from the optical axis. Since offset between laser beam and optical receiving means causes a shift of the image of the optical code which is formed on a photoreceiver (the parallax phenomenon), it is possible for a significant part of the light diffused by the optical code to be directed outside the sensitive area of the photoreceiver.

The inventors have, however, found that this problem can be minimised by suitably offsetting the laser beams in such a way that their distance from the optical axis of said optical receiving means is greater for the laser beam which reads the optical code at the maximum distance and is gradually reduced for the laser beams which read the optical code at gradually decreasing distances.

The inventors have also found that optimum reading of the optical code can be obtained by selection of a minimum reading distance such that at least a prefixed quantity of energy of the light diffused by said optical code falls within the sensitive area of the photoreceiver.

In accordance with the present invention, an optical code scanning reader comprising means for generating laser beams, a least one optical receiving means for collecting and focusing of the light diffused by said optical code, said optical receiving means having an its own optical axis, and a photoreceiver element associated with said optical receiving means, said photoreceiver having a preselected photosensitive area, characterized in that said laser beams travel along a minimum of two different optical paths, in that at least one of said optical paths is offset in respect to said optical axis and that the value of said offset ($H_o$) is preselected such that the quantity of energy of light diffused by said code which reaches said photosensitive area for each beam attains a preselected value.

SUMMARY OF THE INVENTION

In accordance with a preferred embodiment, the reader also comprises means of focusing said laser beams at different reading distances from said optical receiving means, said means defining, for each of said laser beams, a respective depth of reading field.

Advantageously, said offset ($H_o$) has values which decrease with diminishing reading distance. Furthermore, the quantity of energy which reaches said photosensitive area for each beam, in the worst reading condition, must be greater than a preselected minimum.

Preferably, said offset ($H_o$) is maximum for the beam which reads said optical code at the maximum distance ($s_{omax}$), whilst the offset is minimum for the beam which reads said optical code at the minimum distance ($s_{omin}$).

More preferably, said offset ($H_o$) is zero for the beam which reads said optical code at the minimum distance ($s_{omin}$), said beam being coaxial to said optical axis of said optical receiving means.

Even more preferably, said offset ($H_o$) has values intermediate between said maximum and minimum offsets for any beams which reads said optical code at intermediate distances.

Advantageously, said laser beams have depths of field which present overlapping areas.

In accordance with another preferred embodiment, each one of said laser beams is generated by a single laser source.

Preferably, each of said laser beams is obtained by the combination, substantially coaxial, of at least two of the laser sources focused at different distances, said combination being obtained by combinatory means. Said combinatory means may be beamsplitters or polarized beamsplitters.

More preferably, the maximum offset ($H_o$) of said laser beams, in relation to the distance ($s_o$) along the optical axis of said optical receiving means, is selected in such a way that the barycentre of the lightspot obtained by focusing of the light diffused by said code by means of said optical receiving means falls within the sensitive area of the photoreceiver element.

In particular, said maximum offset ($H_o$) is selected by means of the following relation:

$$H_o < H_{pd} * S_o / S_{pd}$$

where $s_o$ is the reading distance, $H_{pd}$ is the maximum semi-dimension of the photoreceiver element, and $s_{pd}$ represents the distance of the photoreceiver element from the optical receiving means.

Preferably, the maximum offset ($H_o$) is selected by means of the following relation:

$$H_o < H_{pd} * s_o (1/f - 1/s_{omax})$$

where $H_{pd}$ is the maximum semi-dimension of the photoreceiver element, f is the focal length of said optical receiving means, and $s_{omax}$ is the maximum reading distance of said optical code.

Advantageously, said photoreceiver element is positioned at a distance ($s_{pd}$) from said optical receiving means such that the light diffused by said optical code, at the maximum reading distance ($s_{omax}$) is substantially focused on said photosensitive area of said photoreceiver.

Preferably, the minimum reading distance ($s_{omin}$) of said optical code by said optical beams is selected in such a way that the quantity of energy of the lightspot, obtained by focusing of the light diffused by said optical code by means of said optical receiving means, falling within the photosensitive area of said photoreceiver element is at least equal to the quantity of energy of the light falling on said photosensitive area in the reading conditions at the maximum distance ($s_{omax}$).

Advantageously, the minimum reading distance ($s_{omin}$) of said optical code is selected by means of the following relation:

$$s_{omin} = \frac{s_{pd} - 2H_{pd} * s_{omax}/D_{rx}}{s_{pd}/f - 1}$$

$D_{rx}$ is the diameter of said optical receiving means, and f is the focal length of said optical receiving means.

Furthermore, the above-mentioned optical paths of said laser beams may be substantially parallel to said optical receiving means or substantially convergent.

Preferably, at least two of said optical paths of said laser beams intersect each other in an overlapping area of the respective depths of field.

In accordance with a further embodiment, the reader also comprises a rotor having mirror faces and an axis of rotation, said rotor being associated with said focusing means and said optical receiving means.

In particular, the above-mentioned laser beams may be aligned on a plane parallel or orthogonal to said axis of rotation of said rotor.

The reader in accordance with the invention therefore enables the required overall depth of field to be obtained without detrimental reductions of power of the laser beams.

BRIEF DESCRIPTION OF THE DRAWINGS

The characteristics and advantages of the invention are now further illustrated with reference to embodiments represented by way of example and not restrictively in the figures appended hereto, as follows.

DESCRIPTION OF THE PREFERRED EMBODIMENTS

Figure 1:
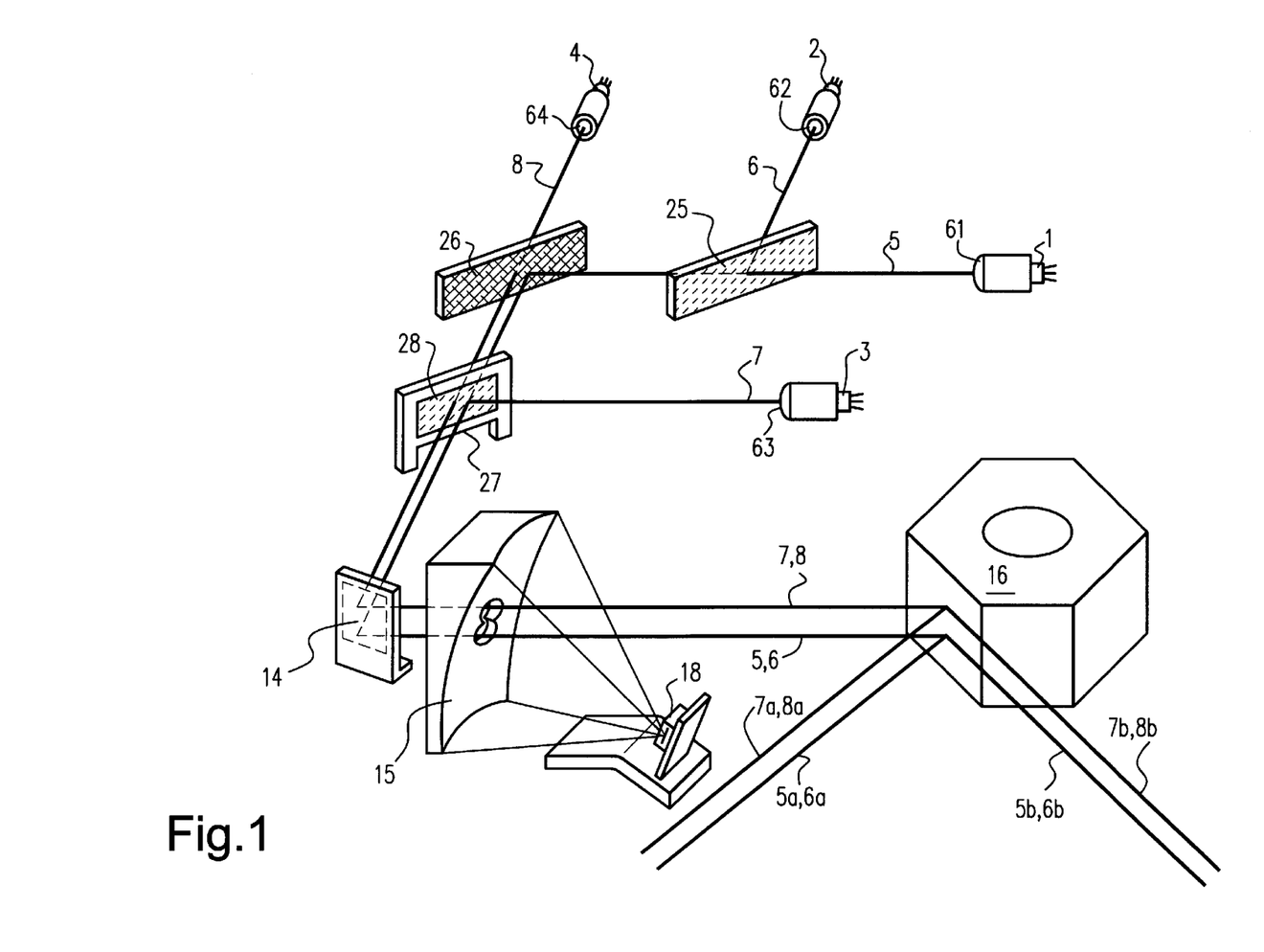
FIG. 1 is a diagram of an optical code scanning reader constructed in accordance with the invention.

FIG. 1 illustrates a scanning reader of an optical code, e.g. a bar code, a two-dimensional code, etc., which is not shown since such codes are already familiar. The reader comprises four laser sources 1, 2, 3 and 4, each of which emits a laser beam, 5, 6, 7 and 8 respectively. The laser sources consist, for example, of laser diodes of semiconductor or other type. Laser sources 1, 2, 3 and 4 are arranged in pairs at the same level: laser sources 1 and 2 are arranged at a lower level and laser sources 3 and 4 at a higher level. Focusing lenses 61, 62, 63, 64, each associated with a laser source, focus each laser beam at different focal points in relation to the required reading distance. In their respective focal point, the laser beams form a spot having a diameter less than the width of the smallest bar of the code to be read (for example, 0.3 mm).

The reader comprises a beamsplitter 25 and a mirror 26, positioned at the same height as laser sources 1 and 2, and a beamsplitter 28, positioned at the same height as laser sources 3 and 4. The reader also comprises a common mirror 14 and a polygonal rotor 16 having mirror faces rotating at preselected speed around an axis of rotation (not shown). The polygonal rotor 16 guides the laser beams onto the optical code to be read, forming two pairs of coincident scanning lines focused at different distances, as illustrated below. The polygonal rotor with mirrors 16 may be replaced by an oscillating mirror. The reader also comprises a receiving lens, or mirror (optical condenser) 15 which concentrates the light diffused by the optical code to be read, as illustrated below, and a receiving photodiode (photoreceiver) 18, arranged close to the focal point of the receiving lens 15, at which an image of the optical code arrives. The optical axis of the receiving lens 15 coincides with the median axis of the photodiode 18.

Laser beams 5 and 6 emitted from sources 1 and 2 are directed towards the beamsplitter 25 which renders said laser beams coincident and combines them in a unidirectional beam 5, 6. The unidirectional laser beam 5, 6 is then directed towards the common mirror 14 by means of the mirror 26 and a window 27. In turn, laser beams 7, 8 emitted by sources 3 and 4 are directed towards the beamsplitter 28 which renders them coincident, generating a unidirectional beam 7, 8, which is also directed towards the common mirror 14. In accordance with the invention, the unidirectional laser beam 5, 6 is, for example, coaxial to the optical axis of the receiving lens 15 and the unidirectional laser beam 7, 8 is offset in respect to said axis by a distance $H_o$. The unidirectional laser beams 5, 6 and 7, 8 are reflected by the mirror 14 and directed towards the polygonal rotor 16, which in turn, directs them onto the optical code to be read, forming two pairs of coincident scanning lines focused at different distances. Each scanning line is identified by two end positions (or reading lobes or "V"s) of the two unidirectional beams 5, 6 and 7, 8. In FIG. 1, the two unidirectional laser beams are identified as 5a, 6a and 7a, 8a in the first end position and 5b, 6b and 7b, 8b in the second end position. Each of the laser beams 5, 6, 7 and 8 (the beam in focus for the preselected reading distance) is reflected by the optical code and the return diffused light is directed across the polygonal rotor 16 towards the receiving lens 15 which focuses it on the photodiode 18, as illustrated below. The photodiode 18 receives the image of the optical code and sends it to a decoding circuit of usual type, not shown.

The two unidirectional laser beams 5, 6 and 7, 8 are aligned on an substantially vertical plane and travel along parallel or slightly convergent optical paths, incident upon the faces of rotor 16 along a plane which is substantially parallel to the axis of rotation (vertical arrangement).

The four laser beams 5, 6, 7 and 8 are focused at four respective focal points arranged, in the case in point, at an increasing distance away from the lens 15. The two focal points of the laser beams 5 and 6 are situated at an increasing distance along the optical axis of the lens and the two focal points of beams 7 and 8 are situated at an increasing distance along a line substantially parallel to the optical axis. Laser beams 5 and 8 are dedicated to reading the optical code, respectively at the minimum distance $s_{omin}$ and the maximum distance $s_{omax}$, whilst laser beams 6 and 7 are dedicated to reading the optical code at intermediate distances between the minimum and maximum distances. Laser beam 5 reads within an area starting at the minimum reading distance $s_{omin}$ and comprises shorter reading distances than those at which laser beam 6 reads, outside a possible overlapping area. Laser beam 7, in turn, reads the optical code at longer reading distances than those at which beam 6 reads, outside a possible overlapping area, and laser beam 8 reads the optical code at longer distances than those at which beam 7 reads, outside a possible overlapping area, up to the maximum reading distance $s_{omax}$. Thus, an individual reading area is determined around each focal point, said individual area having a respective, preselected depth of field. The two unidirectional laser beams 5, 6 and 7, 8 form, therefore, an overall depth of field resulting from the sum of the individual depths of field of the individual beams, outside a possible overlapping area.

Figure 5:
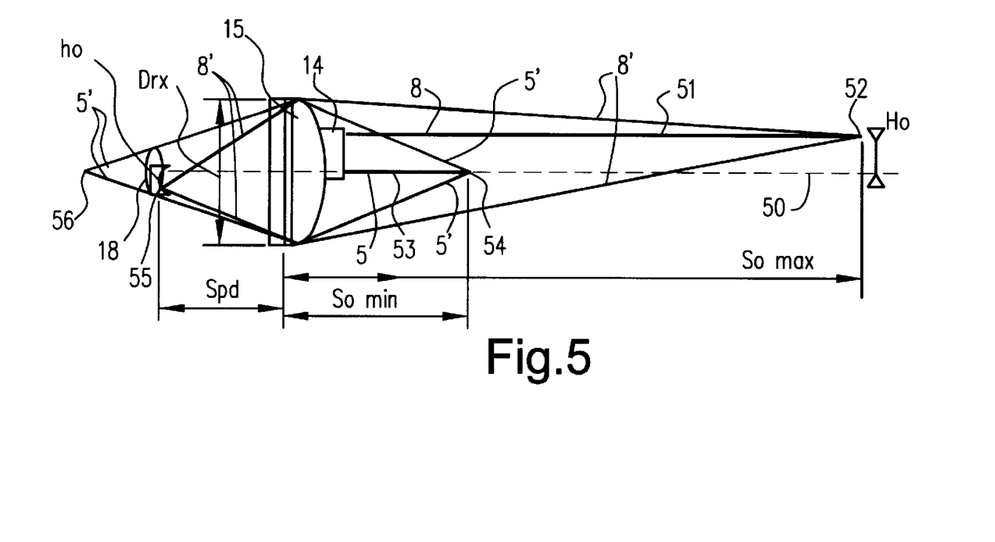
FIGS. 5, 6 and 7 illustrate the mode of operation of the reader in accordance with the invention.

FIG. 5 shows a diagram of the behaviour of laser beams 5 and 8, by way of example. Laser beam 5, dedicated to close reading of the optical code, is focused on a point, not shown, of a close reading field having as its lower end a point 54 which identifies the minimum reading distance ($s_{omin}$) of the beam 5 and hence of the reader 1, in relation to the lens 15. Laser beam 5 passes through an outgoing optical path 53 (from the laser source to the code) coaxial to the optical axis 50 of the receiving lens 15. Laser beam 8, dedicated to far reading of the optical code, is focused on a point, not shown, of a remote reading field having as its upper end a point 52 which identifies the maximum reading distance ($s_{omax}$) of the beam 8, and hence of the reader 1, in relation to the lens 15. Laser beam 8 travels along an optical path 51 situated a distance $H_o$ in any given spatial direction within a 360° arc from the optical axis 50 of the receiving lens 15 (and hence from the optical path of beam 5). In the case in point the distance $H_o$ is measured in a direction perpendicular to the optical axis 50 of the lens 15.

The light 5', diffused by the optical code when said code is struck by the beam 5, is concentrated by the lens 15 on an image point 56. The light 8', diffused by the optical code when said code is struck by the beam 8, is concentrated by the lens 15 in an image point 55.

The image point 55 belongs to the plane containing the photodiode 18 and is slightly eccentric (offset) in respect to the optical axis 50. The image point 56 belongs to the optical axis 50 of the lens 15 and is offset to the rear in respect to the plane containing the photodiode 18.

Laser beams 6 and 7, focused on points intermediate between the focal points of beams 5 and 8, have a behaviour intermediate between that of beams 5 and 8, respectively.

Figure 6:
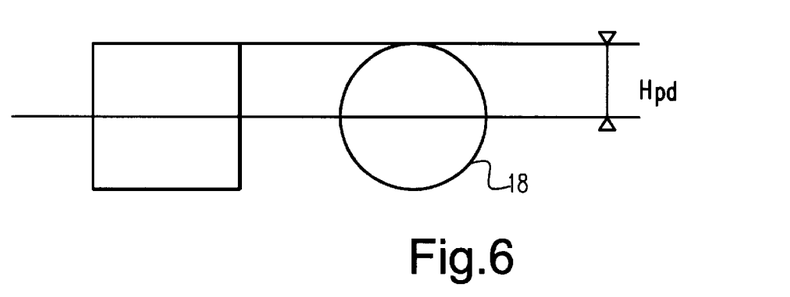

In particular, the reading points included between the minimum distance $s_{omin}$ and the maximum distance $s_{omax}$ and having offsets between 0 and $H_o$ inclusive, correspond to image points included within the space identified by the cone having a base with the same diameter as that of the photodiode 18 ($2H_{pd}$, FIG. 6) and vertex 56.

The offset between the axis of the lens 15 and the laser beam to which the reading spot belongs causes a displacement of the image formed on the photodiode. This displacement varies with variation of the offset and the reading distance and can, if excessive, cause the image spot to shift outside the sensitive area of the photodiode. This phenomenon is called parallax because of its similarity to what happens in cameras with telemetric viewfinders when a subject closer than the distance permitted by the depth of field is framed. Consequently, due to the fact that the laser beams 7, 8 travel along optical paths offset in respect to the axis of the receiving lens, this latter device forms an eccentric (offset) image of the optical code on the photodiode. Because the error of parallax due to offset of the optical paths gradually decreases with increasing distance of the optical code from the receiving lens, the unidirectional laser beam 7, 8 is offset in respect to the optical axis of the receiving lens 15 by a preselected quantity $H_o$ such that the error of parallax introduced by the same is minimised. In addition, each laser beam also shows a "blurring", i.e. the laser beam presents a spot gradually increasing in size commencing from its focal point as it moves away in any direction towards the end of the useful reading field (depth of field). The combined effect of offset or blurring of the laser beam can cause a significant portion of the light diffused by the optical code to leave the sensitive area of the photodiode.

With reference to FIG. 5, $H_o$ is the generic offset at which the beam is situated in respect to the optical axis of the receiving lens when the optical code is situated at the generic distance $s_o$ from said lens, $s_{omin}$ is the minimum reading distance of the reader, $s_{omax}$ is the maximum reading distance of the reader, $s_{pd}$ is the distance of the photodiode from the receiving lens, $H_{pd}$ is the maximum semi-distance of the photodiode (FIG. 6) and $h_o$ is the distance between the centre of the image of the code which is formed on the photodiode and the centre of said photodiode. "Image" is the spot of the beam of laser light diffused by the optical code and concentrated by the receiving lens. This spot may be exactly on the plane containing the photodiode, or slightly further forward or further back in respect to said plane, depending on the distance $s_o$. In other words, the spot on the photodiode may be either perfectly in focus or out of focus (a wider spot, in which the distance $h_o$ from the centre of the spot corresponds to the height of the centre of the "out-of-focus disc").

In accordance with geometrical optics, the above-mentioned parameters can be placed in relation to each other by means of the following relation:

$$H_o = h_o * s_o / s_{pd} \tag{1}$$

It has been found that maximum efficiency of collection of the light diffused by the code is obtained when the photodiode is placed at a distance $s_{pd}$ from the receiving lens so that a spot situated at the maximum possible reading distance away $s_{omax}$ is in focus on said photodiode.

To design the reader it is necessary (1st condition) for the image, or its centre, to fall inside the sensitive area of the photodiode, in other words, that $h_o \leq H_{pd}$, from (1) one obtains:

$$H_o < H_{pd} * s_o / s_{pd} \quad (2)$$

Expressing $s_{pd}$ as a function of the focal length f of the receiving lens and the maximum distance $s_{omax}$ at which it is required to read the optical code, one obtains:

$$H_o < H_{pd} * s_o (1/f - 1/s_{omax}) \quad (2a)$$

This enables definition of the maximum permissible offset $H_o$ at the generic reading distance of the optical code $s_o$.

In turn, to calculate the minimum distance $s_{omin}$ at which the optical code can be read, after fixing the distance of the photodiode from the receiving lens, it is considered that the parallax error at a close distance is more accentuated. So, having selected a distance for the photodiode from the receiving lens such that the code image is in focus when situated the maximum distance away, it is possible to limit the blurring of the image falling on the photodiode when the code is moved closer to the receiving lens. Thus, when the code is very close, a considerably blurred image would be obtained and this would lead to dispersion of a considerable portion of the energy to the outside of the sensitive area of the photodiode.

So, as a criterion for determining the minimum reading distance, with a given offset, it is necessary (2nd condition) for the energy which falls inside the sensitive area of the photodiode to be at least equal to that which falls there when the code is situated the maximum distance away and the corresponding image on the photodiode is in focus. Because the ratio between the energy contained in the spot formed on the photodiode at both the reading distances so and S 2 is substantially equal to the ratio $(s_2/s_1)^2$, it becomes a necessary condition that the diameter of the out-of-focus disc is greater than the dimensions of the area of the photodiode by a factor which is at the maximum equal to the relation between the maximum reading distance and the minimum reading distance.

The following relation was thus determined:

$$s_{omin} = \frac{s_{pd} - 2H_{pd} * s_{omax} / D_{rx}}{s_{pd} / f - 1} \quad (3)$$

where $s_{omin}$ is the minimum reading distance and $D_{rx}$ is the diameter of the receiving lens.

With the arrangement of the laser beams as illustrated, the close image on the photodiode is blurred and there is therefore a greater loss of luminosity, which, however, is compensated by a greater quantity of energy all of which falls onto the photodiode due to the effect of the shorter distance (close reading) at which the code is situated. To be precise, the close image does not fall on the median plane of the photodiode, even though it is coaxial to the photodiode, but further from the receiving lens in respect to said photodiode (point 56 in FIG. 5). Conversely, the remote image (remote reading) is offset in respect to the photodiode but tends to be closer to the median plane of the photodiode and at the maximum distance, is coincident with the position of the median plane of said photodiode (point 55, FIG. 5).

In the reader as illustrated in FIG. 1, there is a total loss of energy of 50% for each laser, instead of the 75% obtained by overlapping on a single optical path with two beamsplitters, as described in the known technique. The polarized beamsplitters are manufactured by a special deposition technology, such that on the first surface they transmit the field component of the field of luminous radiation incident parallel to the plane of incidence with over 90% efficiency, whilst on the opposite surface they reflect the component of the field of luminous radiation incident perpendicular to the plane of incidence with the same degree of efficiency. Because the lasers are highly polarized sources, guiding the two lasers in such a way that they are outgoing in orthogonal polarization, their optical paths can be perfectly overlapped with no appreciable loss of power using polarized beamsplitters instead of beamsplitters of conventional type.

Figure 2:
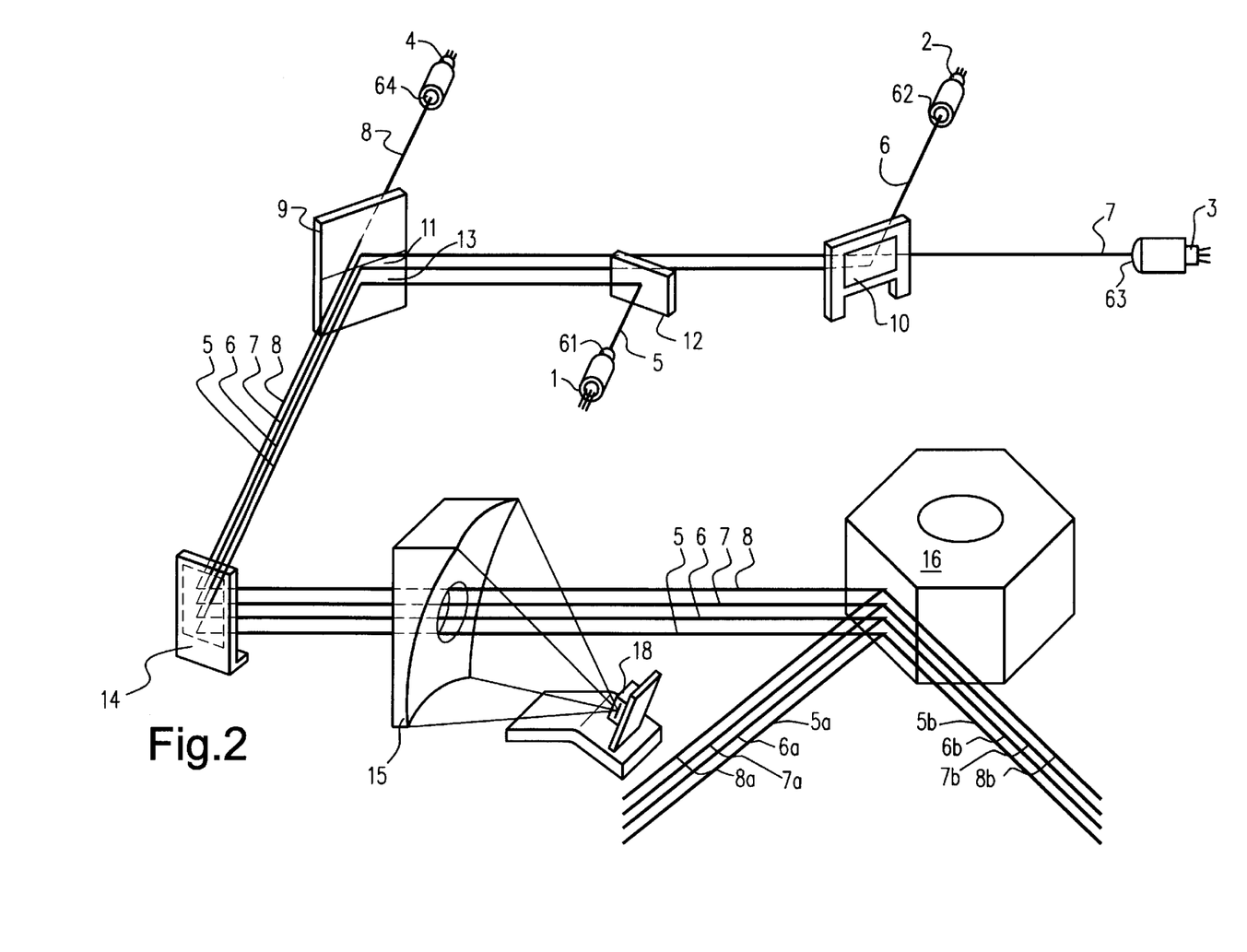
FIGS. 2, 3 and 4 illustrate in diagrammatic form variants of the reader in accordance with FIG. 1.

FIG. 2 illustrates an optical code scanning reader in which the components which are the same as those of the reader in accordance with FIG. 1 are identified by the same numbers. In this case each of the laser sources 1, 2, 3 and 4 is arranged at a preselected level value different from the others. A mirror 12 and a mirror 13 are arranged at the level of source 1, mirrors 10 and 11 are arranged at the level of source 2, a mirror 9 is arranged at the level of source 3.

In this way the laser beams 5, 6, 7 and 8 are aligned on an substantially vertical plane, which also contains the optical axis of the receiving lens 15 and are incident upon the faces of rotor 16 along a plane substantially parallel to the axis of rotation (vertical arrangement). This arrangement, in which the laser beams 5, 6, 7 and 8 strike the mirrors of the rotor 16 along a plane substantially parallel to the axis of rotation, enables generation of coincident optical readings or reading lobes ("V").

Figure 3:
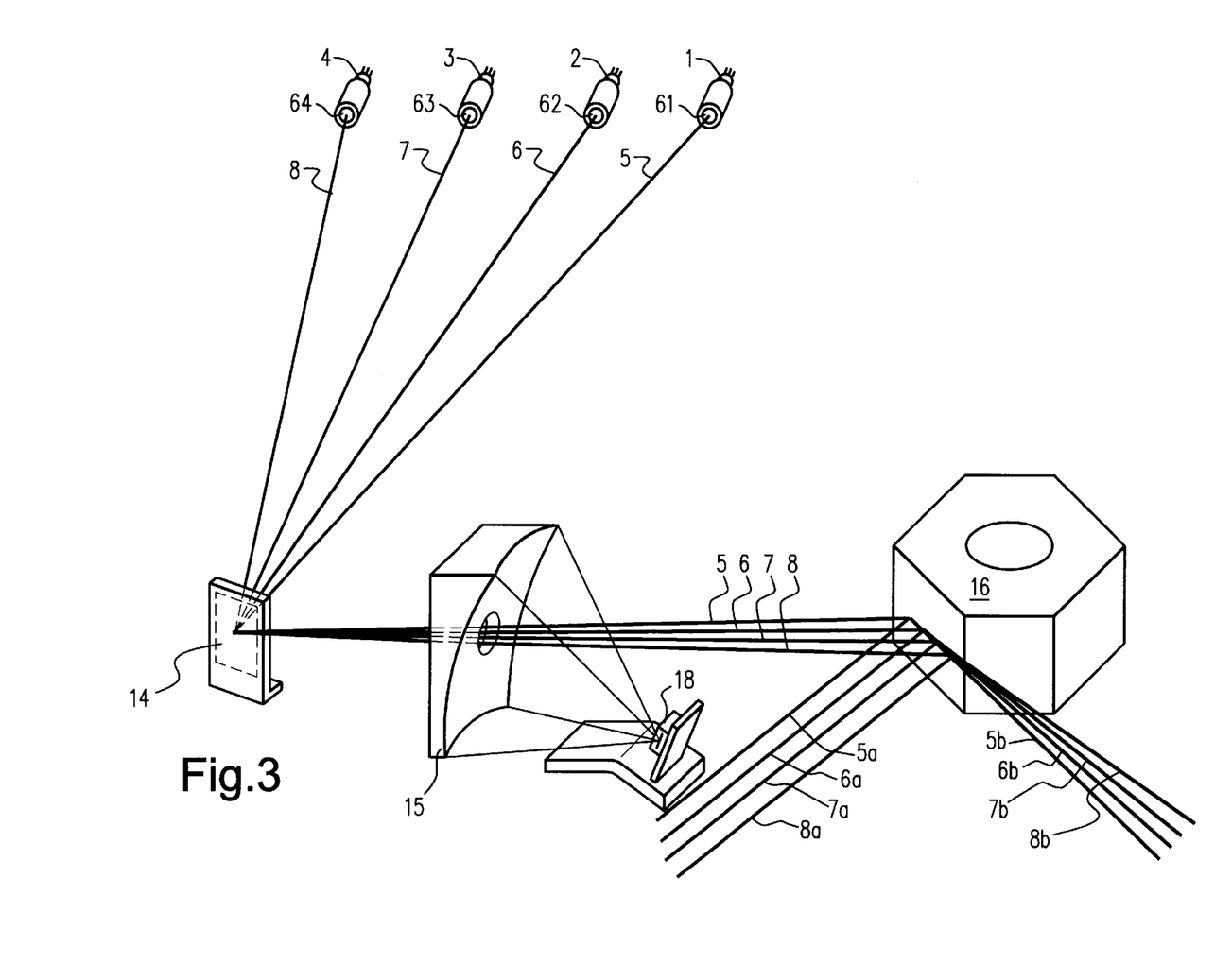

In FIG. 3 an optical code scanning reader is illustrated in which the four laser sources 1, 2, 3 and 4 are arranged at the same level. The laser beams 5, 6, 7 and 8 are side by side on an substantially horizontal plane, which also contains the optical axis of the receiving lens 15 and are incident upon the faces of the rotor 16 along a plane substantially orthogonal to the axis of rotation (horizontal or slightly inclined arrangement). The laser beams 5, 6, 7 and 8 travel along optical paths which are slightly convergent in respect to the optical axis of the lens 15. They are therefore incident upon the faces of the rotor 16 at different points and with different inclinations. It is, however, still possible to create a combination of inclinations and points of incidence such that optical readings, i.e. substantially even if not exactly, overlapping reading lobes (or "V"s) are generated.

Figure 4:
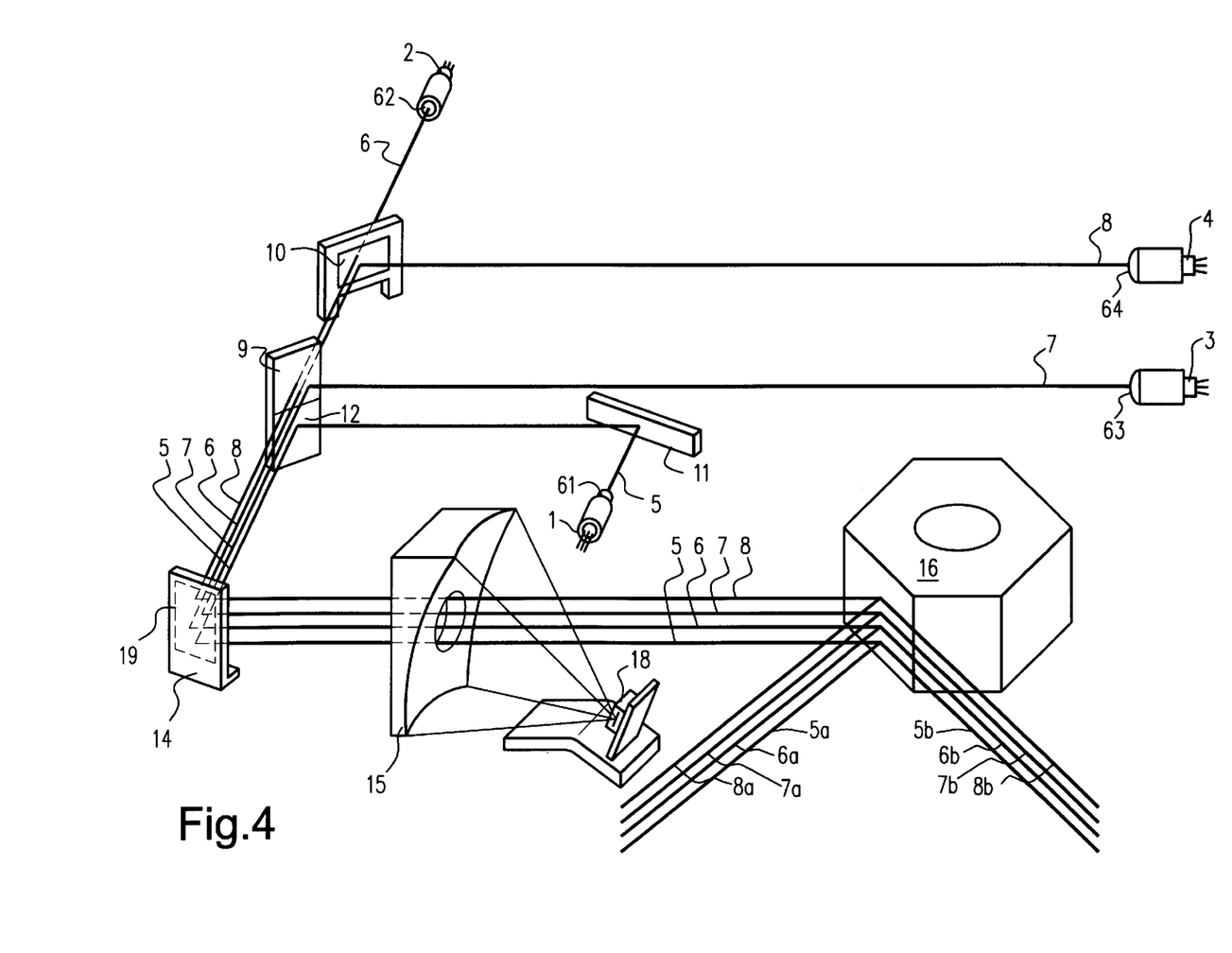

FIG. 4 illustrates a reader in which the laser sources 1 and 2 are both arranged at a level which is preselected such that the optical paths of the laser beams 5 and 6 are parallel, or substantially parallel and the optical path of a laser beam, e.g. beam 5, is coaxial to the optical axis of the receiving lens 15, whilst the optical path of the other laser beam, e.g. beam 6, is offset (distanced in any direction whatsoever) by a preselected quantity in respect to the optical axis of the lens 15. Or else both optical paths of the laser beams 5 and 6 are offset by a preselected quantity in respect to the optical axis of the receiving lens 15. In turn, laser sources 3 and 4 are arranged at a preselected level such that the optical paths of laser beams 7 and 8 are parallel, or substantially parallel, and offset (distanced in any direction whatsoever) by a preselected quantity in respect to the optical axis of receiving lens 15 and in respect to the optical paths of laser beams 5 and 6. In this particular case, the optical paths of laser beams 7 and 8 belong to a plane which is distanced vertically from the plane containing the optical paths of laser beams 5 and 6. The optical paths of laser beams 5 and 6 and those of laser beams 7 and 8 may all be equidistant from the optical axis of the lens 15 or may each be situated a different distance from said optical axis.

Preferably, the mirrors 11 and 12 are arranged at the level of the laser source 1 and mirrors 9 and 10 are arranged at the level of the laser sources 3 and 4. In this way the mirrors 11 and 12 are on the level of the optical path of the laser beam 5 and mirrors 9 and 10 are on the level of the optical paths of the beams 7 and 8.

With the arrangement of the laser sources and mirrors as illustrated in FIG. 4, the laser beams 5, 6, 7 and 8 travel, in pairs, along parallel or slightly convergent paths. They therefore form a quartet of beams arranged at the vertices of a polyhedron, a square section parallelepiped or a rectangle 19 (FIG. 4). Laser beams 5, 6 and 7, 8 are incident in pairs upon the faces of the rotor 16 when in motion, along two planes orthogonal to the axis of rotation of the rotor and parallel to each other. As in the reader illustrated in FIG. 1, the laser beams 5, 6, 7 and 8 are focused on respective focal points arranged at increasing distances from the lens 15 along the optical axis of the lens and along lines parallel, or substantially parallel, to the optical axis. Laser beams 5 and 8 are dedicated to reading the optical code at respectively the minimum and maximum distances, whilst laser beams 6 and 7 are dedicated to reading the optical codes at distances intermediate between the minima and maxima.

Whilst the reader is functioning, laser beam 5 emitted by source 1 is deflected by the mirrors 11 and 12 and directed towards the common mirror 14 and laser beam 6 emitted by source 2 reaches the common mirror 14 by the direct route; laser beams 7 and 8 emitted by sources 3 and 4 are deflected by mirrors 9 and 10 and directed towards the common mirror 14. Thus a quartet of laser beams 5, 6, 7 and 8 is formed which is directed by the common mirror 14 towards the polygonal rotor 16. The mirror faces of the rotor 16 reflect the laser beams 5, 6, 7 and 8 and direct said beams towards the optical code by causing them to move along four scanning lines which intersect the bars of the optical code. Each scanning line is identified by two end positions (or reading lobes or "V"s) of the quartet of beams 5, 6, 7 and 8. In FIG. 1, the quartet of laser beams is identified as 5a, 6a, 7a and 8a in the first end position and 5b, 6b, 7b and 8b in the second end position.

As in the reader in accordance with FIG. 1, each of the laser beams 5, 6, 7 and 8 (the beam in focus for the pre-selected reading distance) is reflected by the optical code and the return diffused light is directed, via the polygonal rotor 16, towards the receiving lens 15, which focuses it on photodiode 18.

Laser beams 5, 6 and 7, 8 travel along different optical paths, distanced from each other by a preselected quantity in respect of the optical axis of the receiving lens 15. As mentioned, they are also focused at four points arranged at different distances from lens 15; in the case in point, at increasing focal distances along the optical axis and along lines substantially parallel to the optical axis.

Figure 7:
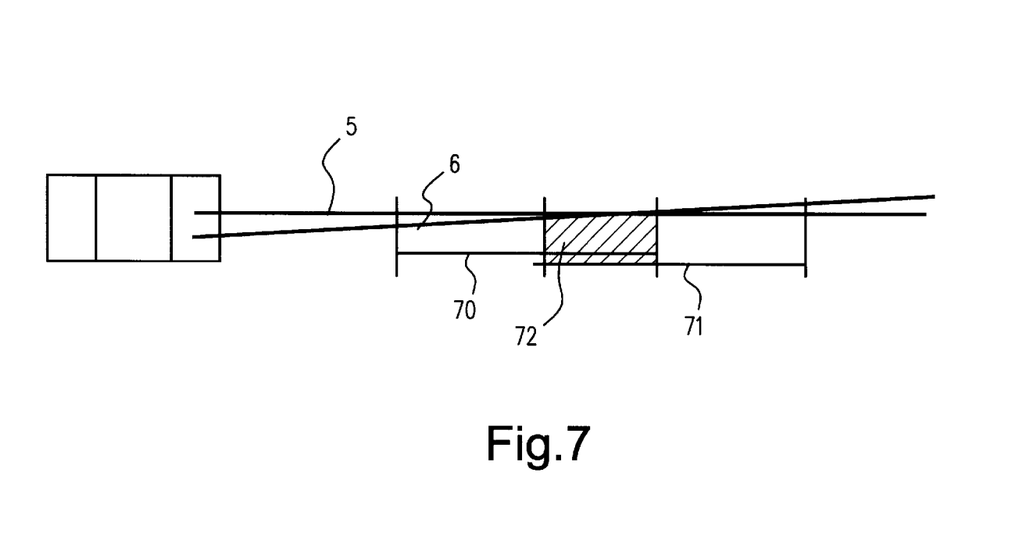

The paths of the laser beams of each pair, 5, 6 and 7, 8 of FIGS. 1 and 4 may be slightly convergent in pairs at a distance from the lens 15 such that the reading fields 70 and 71 of the two laser beams, e.g. 5 and 6, intersect in an overlapping area 72 (FIG. 7). Consequently, for a small area the two scanning lines are perfectly overlapped and the portion of code read is exactly the same for the two laser beams. Reading is therefore more homogeneous. In fact, in circumstances in which it is necessary to reconstruct the code with several successive scans, it is useful to have the code always in the same position; if these scans are carried out by two different laser beams, then it is preferable that, in the overlapping area, where both lasers are capable of reading, the scanning lines are overlapping.

The variants of the reader illustrated in FIGS. 2–4 do not require the use of beamsplitters and therefore do not involve any loss of energy of the lasers.

A typical example of a reader constructed in accordance with the diagram in FIG. 1 and in dimensions to comply with the two relations (2a) and (3) possesses the following characteristics:

focus of receiving optics: f=60 mm diameter of receiving optics: $D_{rx}$=36 mm photodiode semidiameter: $H_{pd}$=0.5 mm photodiode distance: $s_{pd}$=62.5 mm, corresponding to a focusing distance of 1500 mm level of optical path of laser beams 5 and 6 emitted by laser sources 1 and 2 (close reading): $H_{o1}=H_{o2}$=0 mm, constant level of optical path of laser beams 7 and 8 emitted by the laser sources 3 and 4 (remote reading): $H_{o3}=H_{o4}$=6 mm, constant field of reading:

laser 1: 500–750 mm laser 2: 700–1000 mm laser 3: 950–1250 mm laser 4: 1200–1500 mm For beam 5, 6 (lasers 1 and 2) the level of the centre of the image on the photodiode is 0 because it is in the axis. For beam 7, 8 (lasers 3 and 4) the centre of the image on the photodiode is offset by $h_o=375/s_o$. Consequently $h_o$ is 0.39 mm at the minimum reading distance (950 mm) of laser 3 and 0.25 mm at the maximum reading distance (1500) of laser 4. Given that the radius of the photodiode is 0.5 mm, condition (2) is always satisfied for an offset of 6 mm. With regard to condition (3), it is easy to check that, the photodiode being focused at the reading distance of 1500 mm, the resultant minimum reading distance is precisely 500 mm. It can also be seen from the data and from condition (2) that for beam 7 (laser 3), the maximum level to be respected is 7.6 mm at the minimum distance and 10 mm at the maximum distance. The preselected value of 6 mm therefore fully satisfies condition (2). For beam 8 (laser 4) the maximum level to be respected is 9.6 mm at the minimum distance and 12 mm at the maximum distance. Condition (2) is therefore also satisfied by beam 8.

Reference is made to four laser beams in the description of the embodiments of the invention. The invention can nevertheless be carried out with any number of laser beams, provided there are at least two.

What is claimed is:

1. An optical code scanning reader comprising means for generating laser beams, at least one optical receiving means for collecting and focusing the light diffused by said optical code, said optical receiving means having an its own optical axis and a photoreceiver element associated with said optical receiving means, said photoreceiver element having a preselected photosensitive area, characterized in that said laser beams travel along at least two different optical paths, in that at least one of said optical paths is offset in respect to said optical axis and that the value of said offset ($H_o$) is preselected in such a way that the quantity of light energy diffused by said code reaching said photosensitive area attains a preselected value for each beam.

2. A reader according to claim 1, characterized in that it also comprises means which focus said laser beams at different reading distances from said optical receiving means and which define, for each of said laser beams, a respective depth of reading field.

3. A reader according to claim 1, characterized in that said offset ($H_o$) has values which decrease with diminishing reading distance.

4. A reader according to claim 1, characterized in that said quantity of energy reaching said photosensitive area for each beam, in the worst reading condition, is at least equal to a preselected minimum value.

5. A reader according to claim 3, characterized in that said offset ($H_o$) is maximum for the beam which reads said optical code at the maximum distance ($s_{omax}$).

6. A reader according to claim 3, characterized in that said offset ($H_o$) is minimum for the beam which reads said optical code at the minimum distance ($s_{omin}$).

7. A reader according to claim 3, characterized in that said offset ($H_o$) is zero for the beam which reads said optical code at the minimum distance ($s_{omin}$), said beam being coaxial to said optical axis of said optical receiving means.

8. A reader according to claim 3, characterized in that said offset ($H_o$) has values intermediate between said maximum and minimum offsets, for any beams which read said optical code at intermediate distances.

9. A reader according to claim 1, characterized in that said laser beams have depths of field with overlapping areas.

10. A reader according to claim 1, characterized in that said laser beams are each generated by a single laser source.

11. A reader according to claim 1, characterized in that at least one of said laser beams is obtained by the combination, substantially coaxial, of at least two laser sources focused at different distances, the combination being obtained by combinatory means.

12. A reader according to claim 11, characterized in that said combinatory means are beamsplitters.

13. A reader according to claim 12, characterized in that said combinatory means are polarized beamsplitters.

14. A reader according to claim 1, characterized in that the maximum offset ($H_o$) of said laser beams, as a function of said distance ($s_o$) along the optical axis of said optical receiving means, is selected in such a way that the barycentre of the lightspot obtained by focusing of the light diffused by said code by means of said optical receiving means falls within the sensitive area of said photoreceiver element.

15. A reader according to claim 5, characterized in that said maximum offset ($H_o$) is selected by means of the following relation:

$$H_o < H_{pd} * s_o / s_{pd}$$

where
$s_o$ is the reading distance,
$H_{pd}$ is the maximum semi-dimension of the photoreceiver element, and $s_{pd}$ represents the distance of the photoreceiver element from the optical receiving means.

16. A reader according to claim 5, characterized in that the maximum offset ($H_o$) is selected by means of the following relation:

$$H_o < H_{pd} * s_o (1/f - 1/s_{omax})$$

where
$H_{pd}$ is the maximum semi-dimension of the photoreceiver element, f is the focal length of said optical receiving means and $s_{omax}$ is the maximum reading distance of said optical code.

17. A reader according to claim 1, characterized in that said photoreceiver element is positioned at a distance ($s_{pd}$) from said optical receiving means such that the light diffused by said optical code, at the maximum reading distance ($s_{omax}$) is substantially in focus on said photosensitive area of said photoreceiver.

18. A reader according to claim 1, characterized in that the minimum reading distance ($s_{omin}$) of said optical code by said optical beams is selected in such a way that the quantity of energy of the lightspot, obtained by focusing of the light diffused by said optical code by means of said optical receiving means, which falls within the photosensitive area of said photoreceiver element is at least equal to the quantity of energy of the light which falls on said photosensitive area in the reading conditions at the maximum distance ($s_{omax}$).

19. A reader according to claim 18, characterized in that the minimum reading distance ($s_{omin}$) of said optical code is selected by means of the following relation:

$$s_{omin} = \frac{s_{pd} - 2H_{pd} * s_{omax} / D_{rx}}{s_{pd} / f - 1}$$

where
$D_{rx}$ is the diameter of said optical receiving means and f is the focal length of said optical receiving means.

20. A reader according to claim 1, characterized in that said optical paths of said laser beams are substantially parallel to said optical axis of said optical receiving means.

21. A reader according to claim 1, characterized in that the optical paths of said laser beams are substantially convergent.

22. A reader according to claim 1, characterized in that at least two of said optical paths of said laser beams intersect in an overlapping area of the respective depths of field.

23. A reader according to claim 1, characterized in that it also comprises a rotor having mirror faces and an axis of rotation, said rotor being associated with said focusing means and said optical receiving means.

24. A reader according to claim 1, characterized in that said laser beams are aligned on a plane and are incident upon faces of the rotor when in motion along lines parallel to said axis of rotation of said rotor.

25. A reader according to claim 1, characterized in that said laser beams are aligned on a plane and are incident upon faces of the rotor when in motion, along lines orthogonal to said axis of rotation of said rotor.

26. A reader according to claim 1, characterized in that said laser beams are situated on the vertices of a polygon and are incident on the faces of said rotor when in motion describing said polygon on said faces.

* * * * *